No. 852,098. PATENTED APR. 30, 1907.
W. E. BOCK.
METHOD OF SHAPING GLASS ARTICLES.
APPLICATION FILED AUG. 18, 1906.
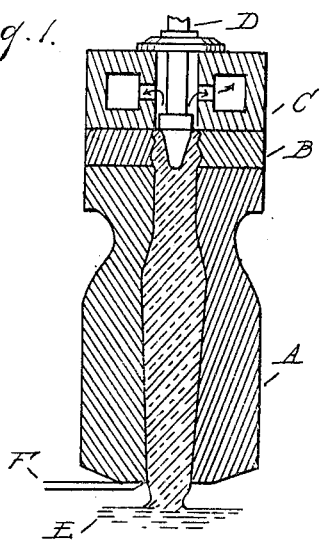
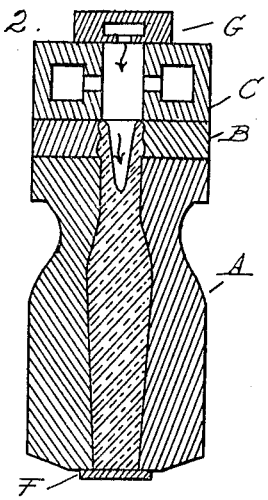
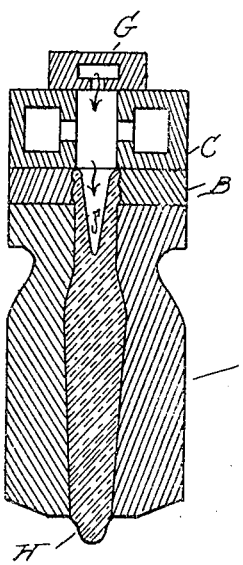
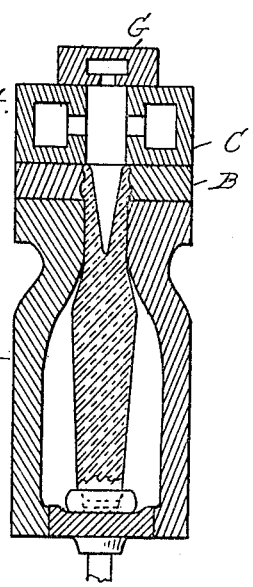
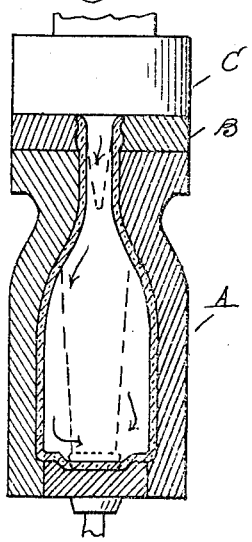
Inventor
William E. Bock

UNITED STATES PATENT OFFICE.

WILLIAM EMIL BOCK, OF TOLEDO, OHIO, ASSIGNOR TO THE TOLEDO GLASS COMPANY, OF TOLEDO, OHIO, A CORPORATION OF OHIO.

METHOD OF SHAPING GLASS ARTICLES.

No. 852,098.  Specification of Letters Patent.  Patented April 30, 1907.

Application filed August 18, 1906. Serial No. 331,128.

*To all whom it may concern:*

Be it known that I, WILLIAM EMIL BOCK, a citizen of the United States of America, residing at Toledo, in the county of Lucas and State of Ohio, have invented certain new and useful Improvements in Methods of Shaping Glass Articles, of which the following is a specification, reference being had therein to the accompanying drawings.

The invention relates to a new and useful method of shaping glass articles, and consists in first forming a blank with a solid body portion, and then in forcing out a section of the body and upsetting the portion thus forced out and finally expanding the blank to form; and further in such a method combined with an intermediate step of blowing the blank more tightly into the blank mold before blowing out the bottom portion, all as more fully hereinafter described and particularly pointed out in the claims.

In the drawings I have illustrated the molds and the suction and blowing head substantially of the type shown in the Owens patent No. 766,768 of August 2, 1904, which machine is one of the machines by which my method may be carried out if suitably modified, and in these drawings I have shown in Figure 1 a blank mold connected with a vacuum-producing means as in the act of filling the mold with glass and before the cut-off is operated; Fig. 2 shows a section through the same mold with the cut off in position, the core or plunger withdrawn, and illustrates the blowing of the blank more tightly into the mold to perfectly shape it; Fig. 3 is a section similar to Fig. 2, with the cut-off withdrawn and showing the bottom of the blank blown out into a teat or projection; Fig. 4 is a section similar to Fig. 3, showing the blowing mold in position with the bottom upsetting the teat or projection; and Fig. 5 shows the article blown to its complete form in the blowing or body mold.

A represents the blank mold, B the neck mold and C the suction and blowing head with which these molds are connected.

D indicates a core or plunger projecting through the blowing head and into the upper end of the mold cavity, these parts being substantially of the construction shown in the Owens patent above referred to, No. 766,768.

In the position shown in Fig. 1 the vacuum producing means is connected with the mold cavity, and the molten glass has been drawn from the mass E to fill the mold cavity at the upper end surrounding the core or plunger, while the cut-off or knife is just in position to sever the blank from the mass.

In Fig. 2 the cut-off knife F has been projected across the lower end of the blank, closing the mold cavity at the lower end, the core or plunger D has been withdrawn and the air valve G has been moved into position admitting air into the upper end of the blank to blow the blank tightly against the mold cavity and thus insure its perfect formation. Sometimes it happens that the vacuum which draws the blank into the mold will partially form the neck, but will not perfectly form it, and this is necessary in making bottles or other articles in which the neck is completed in the gathering operation, and to insure the perfect formation of the neck and the entire filling of the blank mold at all points. This filling operation is shown in Fig. 2.

In Fig. 3 I have shown the parts as in Fig. 2, except that the cut-off F has been withdrawn and a puff of air is then blown into the upper end of the blank, slightly enlarging the cavity therein and forcing a portion of the glass out at the lower end of the blank, forming the projection or teat.

In the operation of cutting off the glass at the lower end of the blank, the cut-off device or knife chills the end of the blank so as to leave a ring-shaped mark or projection on the bottom of the blown article, which more or less disfigures the same, and sometimes leaves sharp edges which are apt to cut the hands of the persons handling the bottle. This circular chilled portion may remain as a scar or excrescence, because that portion of the blank is but very slightly expanded in the blowing operation, or because the knife or cutting tool becomes cooler than the mold section itself, or for both of these reasons.

By blowing out the lower end of the blank, as shown in Fig. 3, I think the glazed or cool portion produced by the cutting operation, and the heat of the molten glass within, which has not been chilled, will very rapidly render plastic the glazed or chilled portion due to the cutting.

In the next operation, which is shown in

Fig. 4, the blowing mold is inclosed about the blank, and the bottom thereof, striking the teat H, will flatten it out across the bottom of the blank and preferably push it up slightly on the sides, so that the lower corner edges of the blank as originally made, which have also been chilled, by the cutting operation, will be re-heated and the glaze thereon melted by the heat of the plastic glass in the projection H. Air is then admitted into the aperture in the top of the blank, and the same is expanded in the mold, as shown in Fig. 5, and it will be seen that the mark of the cutting tool, or the mark produced by the chilling of the glass by the cutting tool, will be practically, if not entirely eliminated and a smooth and perfect bottle formed. This overcomes one of the very great objections which have heretofore existed to the ware produced by such machines.

It is obvious that the method may be carried out by other apparatus, for instance, by such a hand tool as is shown in the Owens patent No. 759,742, dated May 10, 1904.

When the machine such as shown in the Owens patent No. 766,768 is employed, the only change required in the machine is to have a suitable cam for opening the air valve, so as to give a slight puff of air first after the plunger is withdrawn, when that step in the process is used to blow the blank more tightly into the mold and perfect it, then close the valve, and second to again give a slight puff of air after the cutting tool has been withdrawn, so as to produce the teat shown in Fig. 3. It is desirable in carrying out this method with the machine referred to make the blank slightly shorter than the finished product or article, say one-quarter or one-half an inch, so that the projection will not extend too far below the bottom of the blank when the bottom of the blowing mold comes up to flatten it out.

I find that I get fairly good results in the elimination of the scar or excrescence referred to produced by the cutting off without upsetting the projection, but I get better results by upsetting, and prefer to do so.

What I claim is,—

1. The method of shaping glass into hollow articles, consisting in forming a blank with a solid body portion, forcing out a solid teat or projection on the bottom thereof, and blowing the blank to form.

2. The method of shaping glass, consisting in forming a blank, with a solid body portion, forcing out the bottom of the blank, and upsetting the blown out portion and blowing the blank to form.

3. The method of shaping glass into hollow articles consisting in forming in a blank mold a blank with a solid body portion, blowing the blank in the blank mold, blowing into the blank to force out a solid teat or projection at the bottom, upsetting such projection, and then in blowing the blank to form.

4. The method of making bottles, consisting in gathering a blank about a core to form a cavity at the end of the blank, withdrawing the core, blowing into the cavity to more perfectly shape the blank, and finally blowing the blank to its final form.

In testimony whereof I affix my signature in presence of two witnesses.

WILLIAM EMIL BOCK.

Witnesses:
R. LA FRANCE,
S. E. BUTLER.